US 7,076,039 B2

(12) United States Patent
Ghys

(10) Patent No.: US 7,076,039 B2
(45) Date of Patent: Jul. 11, 2006

(54) CALL CHARGING METHOD AND RELATED NETWORK ELEMENTS

(75) Inventor: Freddy Ghys, Beveren (BE)

(73) Assignee: Alcatel, Paris (FR)

( * ) Notice: Subject to any disclaimer, the term of this patent is extended or adjusted under 35 U.S.C. 154(b) by 520 days.

(21) Appl. No.: 10/358,359

(22) Filed: Feb. 5, 2003

(65) Prior Publication Data
US 2003/0156692 A1 Aug. 21, 2003

(30) Foreign Application Priority Data
Feb. 19, 2002 (EP) .................... 02290401

(51) Int. Cl.
*H04M 15/00* (2006.01)
*H04L 12/66* (2006.01)
*H04J 1/02* (2006.01)

(52) U.S. Cl. ..................... 379/114.28; 379/114.01; 370/352; 370/493

(58) Field of Classification Search ........... 379/114.01, 379/114.07, 114.28, 133; 370/352, 355, 370/395.2, 395.5, 395.52, 493, 494, 495; 709/228, 249
See application file for complete search history.

(56) References Cited

U.S. PATENT DOCUMENTS

| 6,601,099 | B1 * | 7/2003 | Corneliussen | 709/224 |
| 6,731,730 | B1 * | 5/2004 | Zolotov | 379/126 |
| 6,804,720 | B1 * | 10/2004 | Vilander et al. | 709/229 |
| 6,910,074 | B1 * | 6/2005 | Amin et al. | 709/227 |
| 6,928,150 | B1 * | 8/2005 | Johnston | 379/114.01 |

FOREIGN PATENT DOCUMENTS
WO WO 99/25107 A 5/1999

OTHER PUBLICATIONS

Patrik Olsson: "IP Multimedia Charging requirements on diameter Accounting" Internet Engineering Task Force 'Online! Nov. 2001, XP002202948, Sweden, pp. 1-13.
Jonathan Rosenberg et al.: "SIP: Session Initiation Protocol" Internet Engineering Task Force, Online! Oct. 26, 2001, XP002202949, p. I-157.
Deutsche Telekom: "Leistungsbeschreibung Datex-P, Stand: May 1, 2001" AGB Deutsche Telekom, 'Online! May 1, 2001, XP002202950, pp. 1-3.
Gutsche B: "Paketuebertragung im isdn-d-kanal" Nachrichtentechnik Electronik, Veb Verlag Technik, Berlin, DE, vol. 47, No. 3 May 1, 1997, pp. 35-37, XP000695496.

* cited by examiner

*Primary Examiner*—Quoc Tran
(74) *Attorney, Agent, or Firm*—Sughrue Mion, PLLC

(57) ABSTRACT

The present invention relates to a Call charging method for charging user agents in a next generation network for network resources used for data-transfer. The next generation network comprises a transport network for coupling a plurality of user agents and at least one call server for controlling communication sessions over the transport network. The communication sessions are being controlled by using signalling messages which are exchanged between at least two user agents via the at least one call server. Each of the signalling messages is analysed for determining an amount of non-signalling information comprised in each of the signalling messages and subsequently the call server processes the amount of non-signalling information for charging purposes.

23 Claims, 3 Drawing Sheets

FIG.1 NGN

CALL CHARGING METHOD AND RELATED NETWORK ELEMENTS

The present invention relates to a call charging method as described in the preamble of claim 1, a call server being adapted to perform the method as described in the preambles of claim 9.

Such a charging method is already known in the art, e.g. from the INTERNET DRAFT "*IP Multimedia Charging requirements on Diameter Accounting*" with reference draft-olsson-ip-multimedia-charging-reqs-00.txt by Patrik Olsson, published in November 2001.

Therein, a call charging method for charging user agents, called SIP clients is disclosed. These user agents are charged for the use of the transport network, called the bearer resources, in a Next generation network. Such a next generation network, called an Internet Protocol Multimedia network in the cited Internet draft is set up as a layered network. A first layer of such next generation network is the transport layer that provides in the establishment of the media bearers between two or more user agents. The establishment of these media bearers between two or more user agents is performed under control of the call control which is located in call servers, called the SIP POC servers and a multimedia session establishment protocol, called the session initiation protocol SIP executed by such call server and each of the user agents. These call servers are located at a second layer of such a next generation network, the session layer.

Additionally, there is a third layer holding service intelligence, which is placed above the session layer, i.e. the application layer.

Charging for the resources in use in this communication session is supported in the call servers by logging of information in a Charge data record. Special charging applications such as a prepaid server are situated at the application layer and get the required information over an interface with the session layer.

The user agents consume resources at the bearer level. To charge the use of these resources a number of parameters are determined and forwarded for logging in the CDR or communicated to the charging related applications in the application layer. To properly reflect the used transport resources, these parameters may comprise the duration of the session, characteristics reflecting the quality of the session and possibly the volume of data exchanged.

To avoid theft of service, charging must count for all resources used during a call. Exchange of media information between the user agents is realised over the transport layer, without involving the session layer where charging is situated.

However, besides the media-transfer on the transport layer, there is still another way wherein a (SIP) user agent is able to send data towards another (SIP) user agent. This is attained by adding user-to-user data to the (SIP) signalling messages (a possibility with SIP is to add a body that needs to be rendered to the involved user agents). Such a user-to-user data-transfer is included in signalling messages is disclosed in Internet Draft "*SIP: Session Initiation Protocol*" with reference draft-ietf-sip-rfc2543bis-05.txt by Jonathan Rosenberg et. Al., published by the Internet Engineering Task Force at Oct. 26, 2001.

Since this user-to-user information is comprised in the signalling message, which is not subject to the charging mechanisms as described above, this data transfer cannot be charged currently.

An object of the present invention is to provide a call charging method, a call server of the above known type but wherein it is enabled to charge such user-to-user data include in a signalling message.

According to the invention, this object is achieved by the charging method described in claim 1 and the network element as described in claim 12

Indeed, by analysing the signalling messages transferred between the user agents and a call server for determining an amount of non-signalling information comprised in any of the signalling messages and subsequently processing this amount of non-signalling information for charging purposes, the transfer of non-signalling information may be charged.

An additional characteristic feature of the present invention is described in claim 2 and claim 13.

The analysing of the signalling messages for determining an amount of non-signalling information is achieved by counting an amount of data exceeding a predetermined amount of data carried by each said signalling message.

An alternative characteristic feature of the present invention is described in claim 3 and claim 14.

The analysing of the signalling messages for determining an amount of non-signalling information is achieved by counting the amount of data carried by each body to be rendered to a user agent.

A further additional characteristic feature of the present invention is described in claim 4 and d claim 15.

The processing is determining online a charge based on the amount of non-signalling information included in said signalling messages.

Another additional characteristic feature of the present invention is described in claim 5 and claim 16.

The processing is forwarding the amount of non-signalling data to a server for including the amount of non-signalling data in a charging record.

Still a further characteristic feature of the present invention is described in claim 6 and claim 17.

The processing may also be forwarding the amount of non-signalling data to an application server for calculating an online charging.

A characteristic feature of the present invention is described in claim 7 and claim 18.

The analysing of the signalling messages for determining an amount of non-signalling information in each of said signalling messages is performed by a call server.

A characteristic feature of the present invention is described in claim 8 and claim 19.

The analysing of the signalling messages for determining an amount of non-signalling information in each of said signalling messages is performed by an application server for calculating an online charging.

Another characteristic feature of the present invention is described in claim 9.

The signalling messages are Session Initiation Protocol signalling messages.

Another characteristic feature of the present invention is described in claim 10.

The next generation network is a Universal Mobile Telecommunication System (UMTS) network.

Still an alternative characteristic feature of the present invention is described in claim 11.

The next generation network may also be an Internet Protocol multimedia network. It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein.

Figure 1:
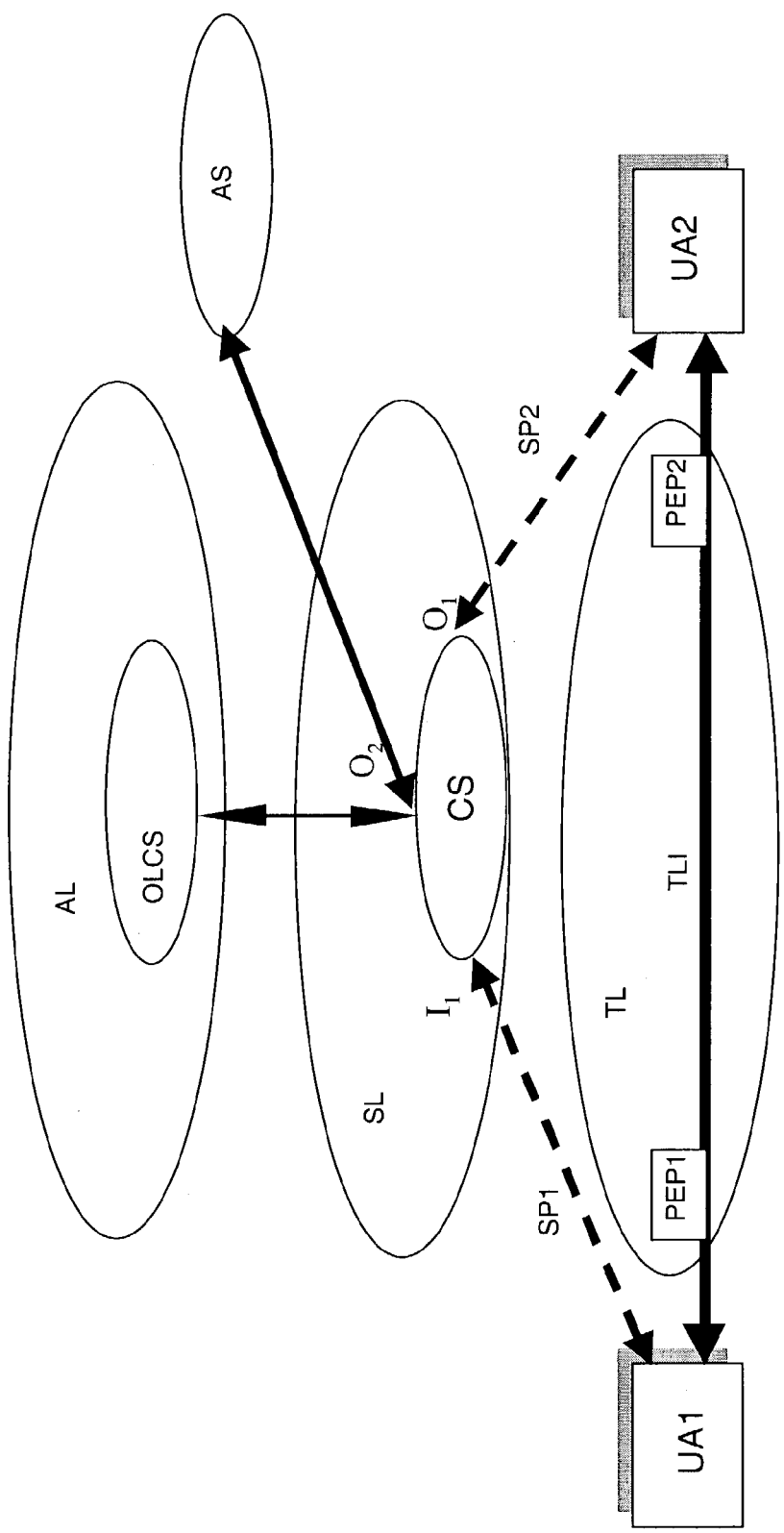
FIG. 1 represents an overview of a Universal Mobile Telecommunication System UMTS next generation network.
Figure 2:
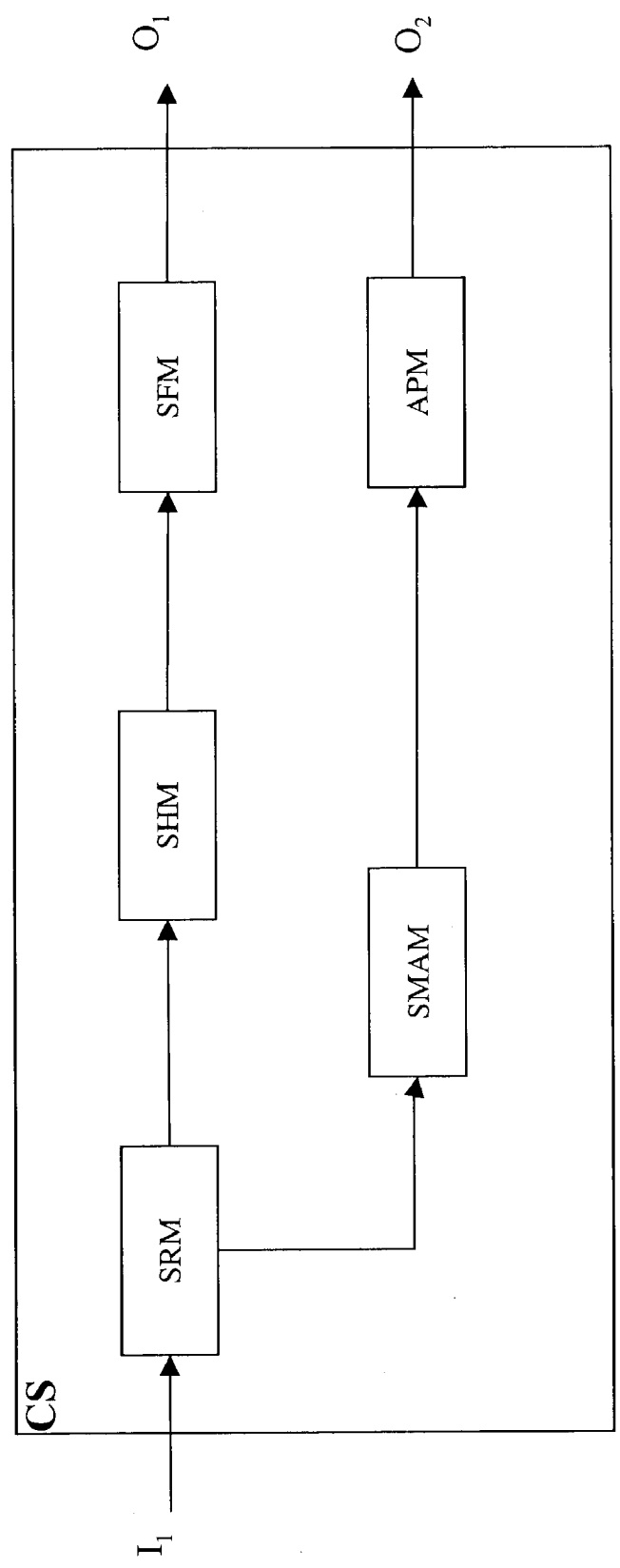
FIG. 2 represents a call server CS of a UMTS next generation network as presented in FIG. 1.

In the following paragraphs, referring to the drawings, an implementation of the charging method and the related call server according to the present invention will be described. In the first paragraph of this description the main elements of the UMTS next generation network as presented in FIG. 1 are described. In the second paragraph, all connections between the before mentioned elements and described means are defined. Subsequently all relevant functional means of the mentioned call server as presented in FIG. 2 are described followed by a description of all interconnections. In the succeeding paragraph the actual execution of the method for session establishment is described.

Such UMTS next generation network comprises a large number of user agents, however in order to keep simplicity in this description it is chosen to only present two user agents UA1, UA2. Moreover there are policy enforcement point PEP1, PEP2 for controlling the data exchange. Such a policy enforcement point PEP1, PEP2 blocks data which is not conform to the characteristics agreed during the reservation phase, since it is not being charged for. The user agent and the policy enforcement point are situated at the transport Layer TL.

Additionally there is at least one a call server CS supporting a multimedia session establishment protocol, in this embodiment chosen to be the Session Initiation Protocol further referred to as SIP which is situated at the session layer SL. In this embodiment only one call server is described, again for sake of simplicity, although such a network may comprise a plurality of such call servers. The session initiation protocol is the protocol used in such a UMTS next generation network for establishing a communication session between at least two user agents UA1, UA2.

Additionally there is an Accounting Server AS that deals with the call charging details received from the call server CS and therefrom generates Charging detail records CDRs.

Further within the application layer AL, there is an online charging server OLCS that is able to calculate online the current charge of a data-transfer based on the call charging details received from the call server CS.

These user agents UA1, UA2 are coupled to each other over a transmission link TLI of the Transport Layer TL of the UMTS network, here being an UMTS air link.

Each of the user agents is coupled to this Transport Link TL via a policy enforcement point PEP located in the transport layer TL.

The call server CS is coupled to the first user agent UA1 over a first signalling path SP1 and coupled to the second user agent UA2 over a second signalling path SP2. Such signalling paths SP1, SP2 again may be UMTS air links. The Accounting server AS is coupled to the call server CS over an Internet Protocol Link and the Online Charging Server OLCS is coupled over an IP-link to the Call Server CS. The call server CS of the UMTS next generation network is presented in FIG. 2. Essential elements of the call server CS are the signalling reception means SRM that is able to receive the SIP signalling message from a first user agent UA1 and hand the message over to the signalling handling means SHM that is adapted to handle the establishment of a communication session between at least two user agents UA1, UA2. Further there is a signalling forwarding means SFM that is able to forward the received SIP signalling message towards the second user agent UA2. Additionally there is a signalling message analysing means SMAM that is adapted to analyse the signalling messages for determining an amount of non-signalling information that is included in each of said signalling messages. The analysing of the signalling messages for determining an amount of non-signalling information that is included in each of said signalling messages may be performed by determining the length of a certain message above a certain length threshold value or by counting the amount of data carried by all bodies which should be rendered to the user agent. It is to be remarked that such a body is an element of a SIP signalling message for carrying non-signalling information. Alternatively, this may be determined by counting the amount of message information that is not identified as strictly required for signalling or by any other method that gives a measure of the carried amount of non-signalling information Furthermore, there is an amount processing means APM that is able to process the amount of non-signalling information for charging purposes.

The signalling reception means SRM has an input-terminal that is at the same time input $I_1$ of the call server CS. The signalling reception means SRM is further coupled with an output to an input of the signalling handling means SHM which in its turn coupled is with an output to an input of the signalling forwarding means SFM. The signalling forwarding means SFM has an output-terminal that is at the same time an output-terminal $O_1$ of the call server CS. The signalling reception means SRM is additionally coupled with an output to an input of the signalling (message analysing means SMAM that is coupled with an output to an input of the amount processing means APM. The amount processing means APM has an output-terminal that is at the same time an output-terminal $O_2$ of the call server CS.

Figure 3:
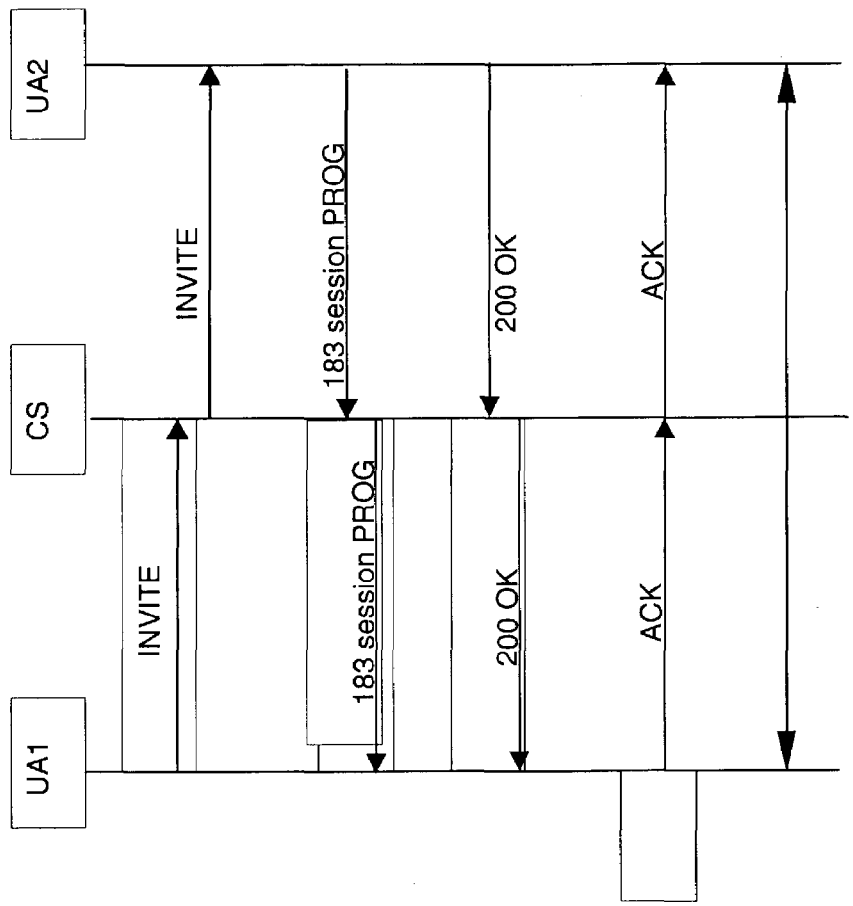
FIG. 3 represents the signalling involved in the call set-up of a communication-session.

In order to explain the operation of the present invention it is assumed that a communication session is to be established between the first user agent, the calling user agent UA1 and the second user agent, the called user agent UA2. Thereto it is assumed that the first user agent UA1, the calling user agent, generates a SIP INVITE signalling message, that is transmitted via the call server CS serving the calling party towards the called user agent UA2. This SIP signalling message contains a description of the required media as proposed by the calling user agent UA1. The signalling message reception means SRM of the Call server CS receives the INVITE message and subsequently hands over the message to the signalling handling means SHM that is adapted to handle the establishment of a communication session between both user agents UA1, UA2 and additionally to the signalling message analysing means SMAM. Further there is a signalling forwarding means SFM that is able to forward the received SIP INVITE signalling message towards the second user agent UA2. (FIG. 3 represents the signalling flow with respect to the call set-up of a communication session involving both user agents UA1, UA2). User agent UA2 receives the SIP INVITE signalling message.

The called user agent UA2 replies to this invite with a SIP "183 session progress" signalling message indicating the media description as acceptable to him.

The session layer reserves resources at the transport layer that fulfil the needs expressed in the message exchange described above, at the same time informing the PEP about the allowed resource consumption. Use of these resources is however still blocked.

When the called user agent UA2 answers the call by transmitting a SIP "200 OK" signalling message via the involved call server CS to the calling user agent UA1, the call server CS will open the resources. Assuming that the moment of answer is the moment that charging will start, this time will be logged in the CDR to make charging in function of duration possible, if charging related application servers (such as a the online charging server OLCS or a prepaid server) are involved, they will be informed about this event.

During the conversation phase of the session, the user agents UA1, UA2 exchange data without involving the session layer SL but only the Transport Layer TL. The data exchange is however controlled by the PEP, data that is not conform to the characteristics agreed during the reservation phase will be blocked, since it is not being charged for.

It is to be noticed that, although it is not completely described, the call server CS also comprises reception means and forwarding means for the opposite signalling message direction, from the called user agent UA2 towards the calling user agent UA1. The signalling flow within the call server CS is bi-directional and all signalling messages are being treated in an analogue way as is described for the SIP INVITE signalling message.

In this way both parties have agreed on the establishment of the communication session. Finally an acknowledgement message ACK is sent from the first user agent UA1 towards the second user agent UA2 to acknowledge the establishment of the call.

The ending of a communication session is indicated by sending a BYE message to the in the communication session involved parties, the BYE message also indicates that the charging is to be ended which is communicated to the charging related devices, the accounting server and/or the online charging server OLCS.

In the mean time the signalling message analysing means SMAM determines by analysing the INVITE signalling messages for determining an amount of non-signalling information that is included in the INVITE signalling message. The signalling message analysing means SMAM checks the bodies of the INVITE message.

Alternatively this amount also may be determined by counting the amount of data that exceeds a certain to be predetermined amount of data, wherein it is supposed that the first amount is signalling data and the subsequent amount of data above the first amount is user-to-user data. Or any other appropriate method could be used.

The amount of non signalling data as determined by the signalling message analysing means SMAM is handed over to the amount processing means APM, that is able to process the amount of non-signalling information for charging purposes. The amount processing means APM is adapted to forward the determined amount of non-signalling information towards an accounting server AS together with information identifying the user agent to be charged for generating charging detail records. The determined amount of user-to-user data being non-signalling information may additionally be forwarded to an application server for calculating an online charging such as the online charging Server OLCS.

In the mean time the signalling message analysing means SMAM determines by analysing the INVITE signalling messages for determining an amount of non-signalling information that is included in the INVITE signalling message. The signalling message analysing means SMAM checks the bodies of the INVITE message.

Alternatively this amount also may be determined by counting the amount of data that exceeds a certain to be predetermined amount of data, wherein it is supposed that the first amount is signalling data and the subsequent amount of data above the first amount is user-to-user data. Or any other appropriate method could be used.

The amount of non signalling data as determined by the signalling message analysing means SMAM is handed over to the amount processing means APM, that is able to process the amount of non-signalling information for charging purposes. The amount processing means APM is adapted to forward the determined amount of non-signalling information towards an accounting server AS together with information identifying the user agent to be charged for generating charging detail records. The determined amount of user-to-user data being non-signalling information may additionally be forwarded to an application server for calculating an online charging such as the online charging Server OLCS.

In addition to the previously described embodiment, the entire Signalling message may be forwarded by a call server to an application server for online charging. This application server may analyse the signalling message itself, in the same way as is described for the call server, and based on the determined amount of non-signalling information the application server may online determine the charge for the transferred non-signalling information in signalling messages.

Another additional embodiment is that a network element, other than the call server or the application server for online charging, is able to perform the analysing the signalling messages for determining an amount of non-signaling information, i.e user-to-user information included in a signalling message and may subsequently forward the amount of non-signalling data for further processing of the charging of the transferred data.

Each of the SIP signalling messages forwarded between user agents along a call server is to be analysed by the signalling message analysing means SMAM in the same way as is done with respect to the INVITE signalling message as each such message may carry user-to-user data. Especially SIP INFO messages are suitable for including user-to-user data and as a consequence should be analysed well.

Furthermore it should be noticed that, although an UMTS network is described, any next generation network such as an Internet Protocol Multimedia network may be equally applicable.

Another remark is that embodiments of the present invention are described above in terms of functional blocks. From the functional description of these blocks it will be obvious for a person skilled in the art of designing electronic devices how embodiments of these blocks can be manufactured with well-known electronic components. A detailed architecture of the contents of the functional blocks hence is not given for most of them.

While the principles of the invention have been described above in connection with specific apparatus, it is to be clearly understood that this description is made only by way of example and not as a limitation on the scope of the invention, as defined in the appended claims.

The invention claimed is:

1. A call charging method for charging user agents in a network for network resources used for data-transfer, said network comprising:
   a transport network for coupling a plurality of user agents; and
   at least one call server for controlling communication sessions over said transport network, said communication sessions being controlled using signalling messages to be exchanged between at least two of said plurality of user agents via said at least one call server, wherein said call charging method comprises:
   analyzing said signalling messages for determining an amount of non-signalling information comprised in each of said signalling messages; and
   processing said amount of non-signalling information for charging purposes.

2. The call charging method according to claim 1, wherein said analyzing said signalling messages for determining an amount of non-signalling information is achieved by counting an amount of data exceeding a predetermined amount of data carried by each said signalling message.

3. Call charging method according to claim 1, characterised in that said analysing said signalling messages for determining an amount of non-signalling information is achieved by counting the amount of data carried by each body to be rendered to a user agent.

4. The call charging method according to claim 1, wherein said processing comprises determining online a charge based on said amount of non-signalling information included in said signalling messages.

5. The call charging method according to claim 1, wherein said processing comprises forwarding said amount of non-signalling data to a server for including said amount in a charging record.

6. The call charging method according to claim 1, wherein said processing comprises forwarding said amount of non-signalling data to an application server for calculating an online charging.

7. Call charging method according to claim 1, characterised in that said step of analysing is performed by said at least one call server (CS).

8. Call charging method according to claim 1, characterised in that said step of analysing is performed by an application server for calculating an online charging.

9. The call charging method according to claim 1, wherein said signalling messages comprise Session Initiation Protocol signalling messages.

10. The call charging method according to claim 1, wherein said next generation network comprises a Universal Mobile Telecommunication System network.

11. The call charging method according to claim 1, wherein said next generation network comprises an Internet Protocol multimedia network.

12. A network element in a network, said network comprising a transport network for coupling a plurality of user agents, and at least one call server for controlling communication sessions over said transport network, said communication sessions being controlled using signalling messages to be exchanged between at least two of said plurality of user agents via said at least one call server (CS), wherein said network element comprises:
   signalling message intercepting means, adapted to intercept said signalling messages exchanged between said at least two user agents via said at least one call server
   signalling message analysing means, adapted to analyze said signalling messages for determining an amount of non-signalling information comprised in each of said signalling messages; and
   amount processing means, adapted to process said amount of non-signalling information for charging purposes.

13. The network element according to claim 12, wherein said signalling message analysing means, is adapted to analyse said signalling messages for determining an amount of non-signalling information by counting an amount of data exceeding a predetermined amount of data carried by each said signalling message.

14. Network element according to claim 12, characterised in that said signalling message analysing means (SMAM), is adapted to analyse said signalling messages for determining an amount of non-signalling information is by counting the amount of data carried by each body to be rendered to a user agent.

15. Network element according to claim 1, characterised in that staid amount processing means (APM) is adapted to determine online a charge based on said amount of non-signalling information included in said signalling messages.

16. Network element according to claim 12, characterised in that said amount processing means (APM), is adapted to forward said amount of non-signalling data to a server for including said amount in a charging record.

17. Network element according to claim 12, characterised in that said amount processing means (APM) is adapted to forward said amount of non-signalling data to an application server for calculating an online charging.

18. The network element according to claim 12, characterised in that said network element is the at least one call server.

19. Network element according to claim 12, characterised in that said network element is an application server for calculating an online charging.

20. A call charging method for charging user agents in a network for network resources used for data-transfer, said network comprising:
   a transport network in which a plurality of user agents are coupled; and
   at least one call server for controlling communication sessions over said transport network, said communication sessions being controlled using signalling messages to be exchanged between at least two of said plurality of user agents via said at least one call server, wherein said call charging method comprises:
   analyzing said signalling messages for determining an amount of non-signalling information comprised in each of said signalling messages; and
   processing said amount of non-signalling information for charging purposes,
   wherein when said communication sessions begin, said at least two of said plurality of user agents communicate via a link within said transport network.

21. A network element in a network, said network comprising a transport network for coupling a plurality of user agents, and at least one call server for controlling communication sessions over said transport network, said communication sessions being controlled using signalling messages to be exchanged between at least two of said plurality of user agents via said at least one call server (CS), wherein said network element comprises:

signalling message intercepting means, adapted to intercept said signalling messages exchanged between said at least two user agents via said at least one call server, signalling message analysing means, adapted to analyze said signalling messages for determining an amount of non-signalling information comprised in each of said signalling messages; and amount processing means, adapted to process said amount of non-signalling information for charging purposes, wherein when said communication sessions begin, said at least two of said plurality of user agents communicate via a link within said transport network.

22. The call charging method according to claim 1, wherein said at least on call server is part of a different network than the transport network of the plurality of user agents.

23. The network element according to claim 12, wherein said at least on call server is part of a different network than the transport network of the plurality of user agents.

* * * * *